(12) United States Patent
Gupta et al.

(10) Patent No.: US 10,201,947 B2
(45) Date of Patent: Feb. 12, 2019

(54) METHOD OF FORMING A SPECTRAL SELECTIVE COATING

(71) Applicant: University of Virginia Patent Foundation, Charlottesville, VA (US)

(72) Inventors: Mool Gupta, Yorktown, VA (US); Ankit Shah, Charlottesville, VA (US)

(73) Assignee: University of Virginia Patent Foundation, Charlottesville, VA (US)

(*) Notice: Subject to any disclaimer, the term of this patent is extended or adjusted under 35 U.S.C. 154(b) by 621 days.

(21) Appl. No.: 14/824,060

(22) Filed: Aug. 11, 2015

(65) Prior Publication Data

US 2016/0049539 A1  Feb. 18, 2016

Related U.S. Application Data

(60) Provisional application No. 62/036,138, filed on Aug. 12, 2014.

(51) Int. Cl.
| | | |
|---|---|---|
| *B32B 1/08* | (2006.01) | |
| *C23C 24/08* | (2006.01) | |
| *C23C 24/10* | (2006.01) | |
| *C23C 24/00* | (2006.01) | |
| *C23C 28/00* | (2006.01) | |
| *G02B 1/113* | (2015.01) | |
| *H02S 40/22* | (2014.01) | |
| *H02S 10/30* | (2014.01) | |
| *B22F 1/00* | (2006.01) | |
| *B22F 3/105* | (2006.01) | |
| *B22F 3/24* | (2006.01) | |
| *F24S 70/25* | (2018.01) | |

(Continued)

(52) U.S. Cl.
CPC .............. *B32B 1/08* (2013.01); *B22F 1/0018* (2013.01); *B22F 1/0062* (2013.01); *B22F 3/1055* (2013.01); *B22F 3/24* (2013.01); *C23C 24/00* (2013.01); *C23C 24/08* (2013.01); *C23C 24/087* (2013.01); *C23C 24/103* (2013.01); *C23C 24/106* (2013.01); *C23C 28/30* (2013.01); *C23C 28/32* (2013.01); *C23C 28/321* (2013.01); *C23C 28/3215* (2013.01); *C23C 28/3455* (2013.01); *F24S 20/20* (2018.05); *F24S 70/20* (2018.05); *F24S 70/25* (2018.05); *G02B 1/113* (2013.01); *H02S 10/30* (2014.12); *H02S 40/22* (2014.12); *B22F 2999/00* (2013.01); *Y02E 10/41* (2013.01); *Y02E 10/52* (2013.01); *Y02P 10/295* (2015.11)

(58) Field of Classification Search
CPC ..... B32B 1/08; F24J 2/0007; F24J 2/02; F24J 2/04; F24J 2/06; F24J 2/07; F24J 2/485; F24J 2/487; C23C 24/00; C23C 24/08; C23C 24/103; C23C 24/106; C23C 28/30; C23C 28/32; C23C 28/321; C23C 28/3215
See application file for complete search history.

(56) References Cited

U.S. PATENT DOCUMENTS

2015/0107582 A1* 4/2015 Jin .................. G02B 1/005
126/676

* cited by examiner

*Primary Examiner* — Walter Aughenbaugh
(74) *Attorney, Agent, or Firm* — Finnegan, Henderson, Farabow, Garrett & Dunner, LLP

(57) ABSTRACT

A method of forming a spectral selective coating is disclosed. The method may include providing particles on a substrate, wherein the particles include submicron particles. The method may farther include sintering the particles under atmospheric pressure to form a sintered layer an the substrate and texturing the sintered layer to provide a submicron surface roughness height on the sintered layer.

20 Claims, 4 Drawing Sheets

(51) Int. Cl.
*F24S 70/20* (2018.01)
*F24S 20/20* (2018.01)

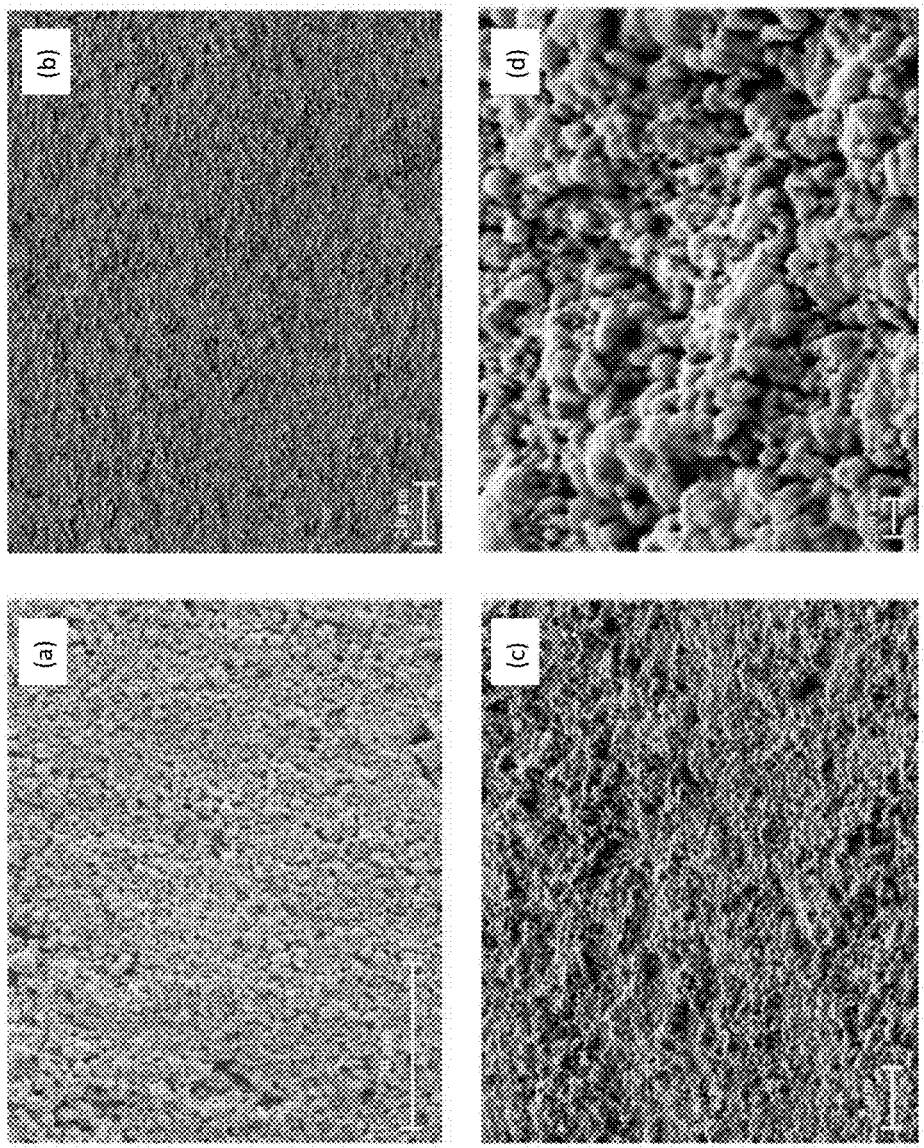
FIGs. 7a-d

METHOD OF FORMING A SPECTRAL SELECTIVE COATING

CLAIM FOR PRIORITY

This application claims benefit, of priority of U.S. Provisional Patent Application No. 62/036,138, filed Aug. 12, 2014, which is incorporated herein by reference.

TECHNICAL FIELD

The present disclosure is directed to a method of forming coating and, more particularly, to a method of forming a spectral selective coating.

BACKGROUND

Concentrated solar power (CSP) is a form of alternative energy that is produced by capturing thermal energy of sunlight and converting it into forms of usable power. CSP systems typically include concentrators, such as parabolic dishes, mirrors, focal lenses, and/or other devices, that concentrate sunlight onto a receiver that absorbs thermal energy from the sunlight. Thermal energy absorbed by the receiver may then be converted into a desired form of power using a corresponding power conversion process. To generate electrical power, for instance, some CSP systems circulate a heat transfer fluid (HTF) through the receiver to carry solar thermal energy to a heat engine for producing mechanical work to drive an electric power generator. Other applications of CSP systems include propelling rockets operated by NASA and/or other space agencies as a replacement for chemical propulsion (e.g., burning fuels) and providing propulsion and on-board power for mini and micro satellites in space. It is also possible to heat an object with concentrated light and the object emission can be controlled (thermophotovoltaics).

The overall efficiency of CSP systems can be improved by raising the operating temperature and increasing the photothermal conversion efficiency of the receiver. The photothermal conversion efficiency of the receiver can be improved by increasing its solar absorptance ($\alpha$) in the solar spectral region (e.g., for wavelengths ($\lambda$)≤2 μm) and lowering its thermal emittance ($\varepsilon$) in the infrared (IR) spectral region (e.g., for $\lambda$≥2 μm) at high operating temperatures (e.g., >650° C.). To achieve this type of performance, the surface of the receiver must be spectral selective or include a selective coating. However, spectral selective materials and coatings that perform well in both the solar and IR spectral regions at high operating temperatures can be difficult to identity and expensive to produce.

Some materials, including metals like gold and silver, for example, have low $\varepsilon$, hut also have low $\alpha$ and are therefore not optimum for use as spectral selective receiver coatings. Other materials, including transparent materials like oxides, nitrides, and carbides have high $\varepsilon$ and low $\alpha$ and are also not optimum. Semiconductors, such as silicon (Si) and germanium (Ge), have been implemented in combination with broadband antireflective coatings to counteract their relatively high solar reflectance and increase $\alpha$. However, these semiconductors have low IR reflectance resulting in high $\varepsilon$, and their performance degrades at high operating temperatures due to thermal oxidation.

Since materials having intrinsic optical properties that provide high spectral selectivity (e.g., $\alpha$>95% and $\varepsilon$<10%) at temperatures higher than 500° C. are not found in nature, some manufacturers have implemented coatings comprising multiple materials in an attempt to improve the spectral selectivity of receivers. For example, coatings formed of multiple layers of metals (e.g., Mo, Ag, Cu, Ni, etc.) and dielectric materials (e.g., $Al_2O_3$, $SiO_2$, $CeO_2$, ZnS, etc.) stacked on the receiver surface have been implemented. However, inter-diffusion between the layers at high operating temperatures causes the performance of the receiver to degrade. Additionally, these coatings are manufactured in a vacuum environment and require precise control of layer thickness, which increases the cost of production.

Other material combinations that have been implemented in an attempt to improve spectral selectivity include ceramic-metal composites (cermets). Cermets comprise a mixture of metallic particles in a dielectric host and are deposited in layers on a metallic film. Cermet layers act as absorbers in the solar spectral region to increase $\alpha$ and as reflectors in the IR spectral region to reduce $\varepsilon$. Cermet layers serve as a graded index material that causes reduced reflection in the solar spectrum and increased absorptance in the IR spectrum as a result of electromagnetic wave interaction with metal particles and interference phenomenon. However, the performance of cermet layers degrades at high operating temperatures due to thermal oxidation that occurs when they are exposed to air. Cermet coatings are also costly to produce since they are made using vacuum fabrication techniques.

To reduce the effects of thermal oxidation at higher operating temperatures, some manufacturers have implemented vacuum enclosures that encapsulate the absorbing surface of receivers. However, the thermal stability of known receivers degrades beyond 350°-580° C. despite the implementation of vacuum enclosures. Additionally, the implementation of vacuum enclosures increases the design complexity as well as the cost to produce solar absorbers.

Some manufacturers have implemented surface texturing of materials as a way to increase solar absorptance of solar cells. In CSP applications, cermets and metals have been textured to achieve solar selectivity, which permits optical trapping of solar light through multiple reflections, resulting in higher solar absorptance. However, the performance of known textured surfaces drops due to oxidation at high operating temperatures.

Previously, sub-wavelength periodical tungsten (W) structures have been fabricated by fast ion beam etching. The fabricated sub-micron holes on tungsten can cause standing wave resonances that have been attributed to increase broad wavelength absorptance. However, this technique requires an expensive tungsten substrate and utilizes complex fabrication processes. Sub-wavelength structures on metal surfaces can increase solar absorptance due to surface plasmon absorption and also due to the surface behaving like graded index medium, thereby providing antireflection. IR reflectance from sub-wavelength structures on metal surface can be kept high when the IR wavelengths are longer than the dimensions (e.g., height and/or spacing) of surface roughness, causing the surface to appear smooth and radiate as a flat surface.

The disclosed method addresses one or more of the problems discussed above and/or other problems of the prior art.

SUMMARY

In one aspect, the present disclosure is directed to a method of forming a spectral selective coating. The method may include providing metal particles on a substrate, wherein the particles include submicron particles. The method may further include sintering the particles under atmospheric pressure to form a sintered layer on the substrate and texturing the sintered layer to provide a submicron surface roughness height on the sintered layer.

In another aspect, the present disclosure is directed to a spectral selective coating. The spectral selective coating may include a substrate and a sintered layer disposed on the substrate. The sintered layer may be formed of particles sintered under atmospheric pressure. The particles include submicron particles, and the sintered layer may be textured and have a submicron surface roughness height on the sintered layer.

In another aspect, the present disclosure is directed to a solar receiver. The solar receiver may include an absorber tube having an outer surface, and a spectral selective coating disposed on the outer surface of the absorber tube. The spectral selective coating may include a metal substrate and a sintered layer disposed on the metal substrate. The sintered layer may be formed of particles sintered under atmospheric pressure. The particles may include submicron particles, and the sintered layer may be textured and have a submicron surface roughness height on the sintered layer.

BRIEF DESCRIPTION OF THE DRAWINGS

FIGS. 7a-d show electron microscopic images of metal powder and sintered metal that may be used in conjunction with the coatings of FIGS. 2 and 4;

DETAILED DESCRIPTION

Figure 1:
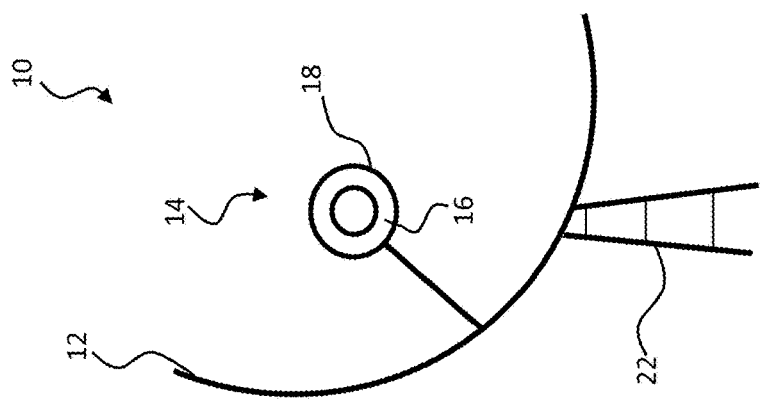
FIG. 1 is a pictorial illustration of an exemplary disclosed concentrated solar power system.

FIG. 1 shows a CSP system 10 having a reflector 12 configured to concentrate sunlight onto a receiver 14. Receiver 14 may include an absorber tube 16 having an outer surface 18. A spectral selective coating 20 (shown only in FIGS. 2-3) may be disposed on outer surface 18 of absorber tube 16 and may be configured to increase the solar absorptance α of absorber tube 16 in the solar spectral region and lower the thermal emittance ε of absorber tube 16 in the infrared spectral region. Although the embodiment of FIG. 1 depicted as a CSP system, it is understood that spectral selective coating 20 may be applied to other devices and systems, such as, for example, boilers, automobile components, power plants, nuclear industries, etc., where it is desired to selectively control absorptance α and/or emittance ε.

Reflector 12 may be a mirror configured to concentrate sunlight onto receiver 14. For example, reflector 12 may be a parabolic trough mirror that is configured to concentrate sunlight along a focal line. In other embodiments, reflector 12 may be an enclosed trough, a Fresnel reflector, a dish Sterling, or a flat mirror. Reflector 12 may be attached to a frame 22 configured to support reflector 12. In some embodiments, frame 22 may be a single-position frame, in other embodiments, frame 22 may be adjustable to allow the position of reflector 12 to be selectively controlled. For example, frame 22 may include a motor that is automatically actuated to control the position of reflector 12 with respect to the sun (i.e., reflector 12 may be a heliostat).

Receiver 14 may be positioned in the focal line of reflector 12. Although receiver 14 is shown as having absorber tube 16, receiver 14 may alternatively embody a different type of receiver, such as a gas receiver, a film receiver, a solid particle receiver, or another type of receiver. Absorber tube 16 may be configured to allow a fluid, such as a working fluid or a heat transfer fluid, to flow therethrough. As the fluid flows through absorber tube 16, the fluid may absorb heat from the sunlight directed onto outer surface 18 by reflector 12. Heat within the fluid may be converted into mechanical power via a heat engine or other power conversion device (not shown) that may be operatively connected to drive an electric power generator (not shown).

Figure 2:
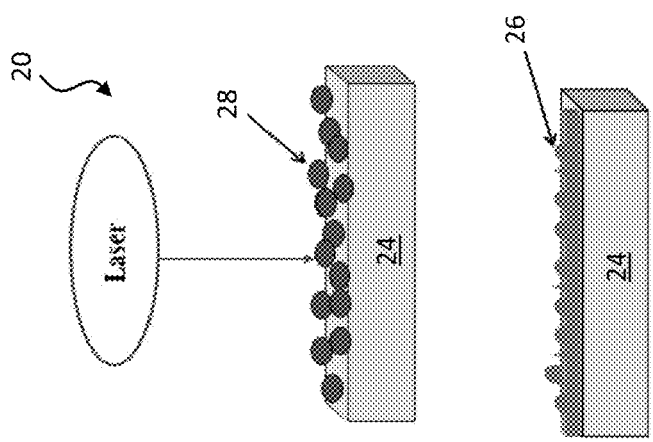
FIG. 2 is an isometric view illustration of an exemplary disclosed spectral selective coating that may be used with the system of FIG. 1.

Spectral selective coating 20 may be disposed on outer surface 18 of absorber tube 16 and configured to increase the solar absorptance α of absorber tube 16 in the solar spectral region and lower the thermal emittance ε of absorber tube 16 in the infrared spectral region. As shown in. FIG. 2, spectral selective coating 20 may include a substrate 24 and a sintered layer 26. Sintered layer 26 may be formed on substrate 24 from metal particles 28 sintered under atmospheric pressure. Sintering under atmospheric pressure may create a non-uniform surface roughness with random height and spacing on sintered layer 26. The surface roughness height and spacing may provide spectral selectivity by acting as a graded index medium that traps electromagnetic waves with multiple reflections. The surface roughness height and spacing may be on a micron and a nanoscale level. For example, the surface roughness height may range from 10 nm to 20 μm.

Substrate 24 may be a metal substrate. For example, substrate 24 may be a steel substrate (e.g., stainless steel, etc.). Other substrates may be used, such as steel alloys, copper, tungsten, polished metals, etc.

Metal particles 28 may be in a powder form and include submicron particles. That is, metal particles 28 may have a dimension that is less than 1 micron before sintering. For example, particles 28 may include particles having a dimension (e.g., a length, a diameter, etc.) between 10-300 nm. It is understood that submicron particles may be larger or smaller, if desired. In this way, sintered layer 26 may have a submicron surface roughness after metal particles 28 are sintered. Particles 28 may also or alternatively include particles having a dimension greater than or equal to 1 micron. For example, particles 28 may include particles having a dimension between 1-20 μm. Particles 28 may include one or more types of metals, such as tungsten, nickel, chromium, steel gold, silver, tantalum, hafnium, molybdenum, etc.

In some embodiments, metal particles 28 may have intrinsic thermal and optical properties leading to better performance at higher operating temperatures. For example, metal particles 28 may have high melting temperatures (e.g., 800°-3410° C.) and good thermal stability at operating temperatures greater than or equal to 650° C. Metal particles 28 may also intrinsically have relatively high absorptance $\alpha$ in the solar spectrum and low thermal emittance $\varepsilon$ in the IR spectrum in comparison to other metal.

Sintering may be a process in which particles (e.g., metal particles 28, ceramic particles, etc.) in a powder form are heated to a temperature near to their melting point, at which the particles weld together and the density of tire resulting layer increases. Sintering may include solid state sintering (SSS) and liquid phase sintering (LPS). SSS occurs when the powder is densified wholly in a solid state at the sintering temperature, while liquid phase sintering occurs when a liquid phase is present in the powder compact during sintering. The mechanism of sintering is attributed to the reduction of free surface-energy of the particles, which results in inter-particle attraction and densification.

Figure 3:
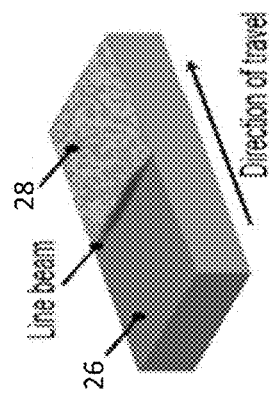
FIG. 3 is an isometric view illustration showing an exemplary sintering process configuration that may be used to fabricate the coating of FIG. 2.

The sintering process may also or alternatively include laser sintering. FIG. 3 shows an exemplary laser sintering configuration. During laser sintering, a laser beam is scanned over metal particles 28 to form sintered layer 26. Upon interaction with particles 28, the laser beam may undergo multiple reflections, which may lead to higher optical penetration depths in comparison to bulk materials. In one example, direct metal laser sintering (DMLS) may be used, wherein sintering is performed without additives. DMLS may be typically used to create sintered objects having complex geometries. Lasers that may be used during the sintering process may include a high powered direct diode laser (e.g., a 250 W CW diode laser), a pulsed Nd:YAG laser with frequency doubler, an Nd:YAG fiber laser, a pulsed nitrogen laser, or a diode pumped solid state laser with frequency doubler. Using laser sintering, the desired spectral selective sintered layer can be formed not only at a reduced manufacturing cost, but also at a relatively high speed compared to other methods, which may also save significant manufacturing time and further reduce costs.

Sintering may be performed under ambient conditions, such as ambient temperature and atmospheric pressure. Although sintering is generally performed under vacuum conditions, costs associated with producing a vacuum environment can significantly increase the cost to produce spectral selective coatings. Sintering under atmospheric conditions may allow for sintering to be performed at a significantly lower cost while also yielding a coating that is stable at operating temperatures above 580° C. Sintering may be performed under inert atmospheric conditions such as nitrogen gas or argon gas.

Sintered layer 26 may be textured and have a submicron surface roughness height and/or spacing. Texturing may refer to variations in surface toughness height and/or spacing of sintered layer 26. Surface roughness height may refer to height differences between adjacent particles after sintering. Surface roughness spacing may refer to a length of space or a distance between adjacent particles after sintering. The surface roughness heights and spacing may be random after sintering. That is, the surface roughness heights and spacing may be non-uniform, non-homogeneous, and/or without a pattern. Texturing may occur naturally after sintering. That is, the sintering process under atmospheric pressure may impart texturing upon sintered layer 26.

Figure 4:
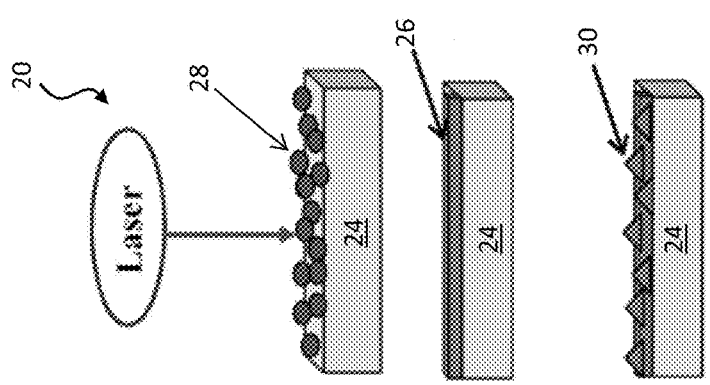
FIG. 4 is an isometric view illustration of an exemplary disclosed spectral selective coating that may be used with the system of FIG. 1.

In some embodiments, sintered layer 26 may be further textured during a post-processing step. The post processing step may include surface texturing techniques, such as laser texturing. Laser texturing may be used to impart further texturing on sintered layer 26. As shown in FIG. 4, sintered layer 26 may be further textured in a post-processing step to form a post-processed sintered layer 30. Texturing via the post-processing step may further increase the absorptance $\alpha$ and decrease the emittance $\varepsilon$ of sintered layer 26.

Figure 5:
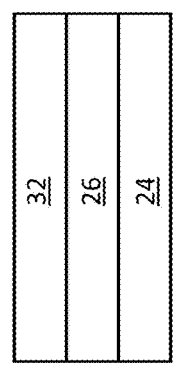
FIG. 5 is a pictorial illustration of an exemplary disclosed spectral selective coating having an antireflective coating that may be used with the system of FIG. 1.

As shown in FIG. 5, some embodiments may include applying an antireflective or oxidation protective coating 32 to sintered layer 26. For example, a solution, based antireflection coating may be applied under atmospheric pressure to sintered layer 26 to further increase absorptance $\alpha$. The antireflective coating may be, for example, an oxide based coating (e.g., $TiO_x$, $SiO_x$, etc.) with a thickness of ~100 nm in this way, the performance of spectral selective coating 20 may be further increased, and sintered layer 26 may be protected from oxide degradation.

It will be apparent to those skilled in the art that various modifications and variations can be made to the disclosed method. Other embodiments will be apparent to those skilled in the art from consideration of the specification and practice of the disclosed method. It is intended that the specification and examples be considered as exemplary only, with a true scope being indicated by the claims included with this specification and their equivalents

INDUSTRIAL APPLICABILITY

The disclosed method may be applicable in the formation of spectral selective coatings to improve the overall efficiency and durability of solar receivers and other devices where higher operating temperatures are desired. The disclosed method may also reduce the cost to produce spectral selective coatings by permitting fabrication under atmospheric pressure.

Embodiments of the present invention may be utilized in conjunction with a number of methods, products, systems and services. For example, the disclosed method may be used to improve the efficiency of thermoelectric devices by increasing their spectral selectivity. The disclosed method, may also be used to improve solar thermophotovoltaic devices by increasing their spectral selectivity. Embodiments of the present invention may be used in conjunction with devices that operate at high temperatures where the need for selective control of absorptance and emittance is desired, such as, for example, solar thermal devices, boilers, power plants, nuclear industries, automobiles, etc. Embodiments of the present invention may optical elements that can be used to control light absorption and emission. An embodiment of the disclosed method will now be discussed.

Experiment

Equipment used during the experiment may include a diode laser (e.g., a 250 W CW diode laser), a pulsed Nd:YAG laser with frequency doubler, an Nd:YAG fiber laser, a pulsed nitrogen laser, or a diode pumped solid state laser with frequency doubler. Other types of lasers may be used, if desired. Experimental equipment may also include a lens, a powder feeder system, a computer controlled high, precision X-Y stage, a scanning electron microscope, a FT-IR spectrometer, a laser confocal microscopy unit, and an integrating sphere.

Figure 6:
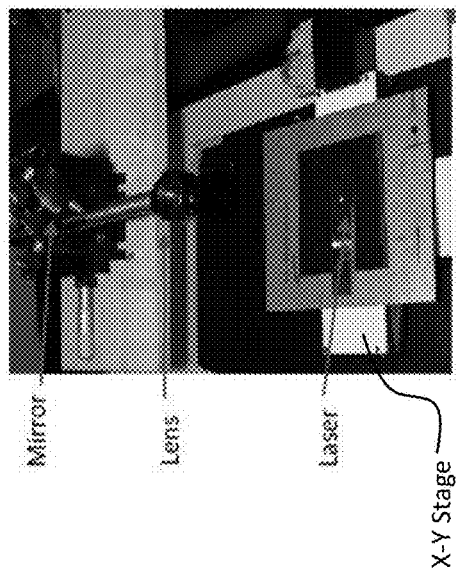
FIG. 6 is a photograph image of an exemplary experimental setup that may be used in conjunction with the sintering process of FIG. 3.

During pulsed laser sintering, a beam is focused onto metallic particles, and light from the beam, gets absorbed by the particles, thereby raising the temperature of the particles. When the temperature becomes high enough, the surfaces of the particles melt and molten particles form necks adjacent to each other forming a continuous layer. Particles may also bond to the substrate during the sintering process. For large area sintering, the sample is scanned under the laser beam using a computer controlled X-Y stage. FIG. 6 shows exemplary laser sintering equipment that may be used to carry out the disclosed method.

Laser sintering of tungsten micro (e.g., 1-5 μm) and nano (e.g., 80-100 nm) particles was carried out on stainless steel (SS) substrate to form a spectral selective layer. Tungsten particles are commercially available, and the particles for this experiment were supplied by SkySpring Nanomaterials Inc. Tungsten powder was chosen for this experiment because tungsten intrinsically has relatively high absorptance in the solar spectrum and low emittance in the IR spectrum in comparison to other metals. Tungsten also has a high melting temperature and is relatively stable at high operating temperatures. It is noted, however, that other types of metal particles may also or alternatively be used. In other embodiments, particles made of semiconductor materials, insulators, etc., may be used.

The tungsten powder was put in a beaker containing isopropyl alcohol, and the mixture was then ultrasonicated for 5 minutes. The ultrasonication was done to break the agglomeration of tungsten nanoparticles. A dropper was then used to deposit the solution mixture from the beaker onto the stainless steel substrate, and the solution mixture was kept aside at room temperature for the alcohol to evaporate. After approximately 20 min, the alcohol evaporated leaving only tungsten powder on stainless steel substrate, which is referred to herein as the "sample."

This sample was then mounted on a computer controlled X-Y stage for laser sintering. A 1064 nm wavelength laser with a repetition rate of 50 kHz and a lens with focal length of 40 mm were used for laser sintering. The laser energy density used for sintering varied from 0.8 to 1.3 J/cm 2. The laser beam was incident on the sample as it was scanned in horizontal and vertical directions resulting in sintered tungsten layer on the stainless steel substrate. The scan rate of the X-Y stage was 1 mm/s. After this first laser scan, tungsten powder was again deposited on the sintered region and the same procedures as described above were followed during a second scan. Laser sintering was carried out under atmospheric pressure.

Solar absorptance measurements were done using an integrating sphere, supplied by Lahsphere Inc., and laser wavelengths of 532 nm, 633 nm, 1064 nm, and 1550 mm. Reflectance measurements in the IR spectrum were done using a continuum IR microscope that was purchased from Thermo Fisher Scientific Inc. The sample was illuminated by IR wavelengths ranging from 4 to 12 microns, and reflected power was measured to provide a reflectance versus wavelength curve. The IR microscope has the ability to collect reflected light at an angular range of ±35° from normal to the sample. Emittance was calculated based on experimental reflectance data and blackbody irradiance spectrum at 300 K.

Morphological Study of Laser Sintered Tungsten Micro- and Nano-Particles

FIG. 7a shows a scanning electron microscope (SEM) image of raw tungsten powder. Most particles are submicron (80-200 nm) in size but some of them are in the rage of 1-5 microns. After laser sintering, a sintered layer of tungsten is formed as shown in FIG. 7b. The layer is continuous without any cracks or discontinuity. FIG. 7c shows a higher magnification image of the sintered tungsten layer. The film is continuous and the roughness is starting to become more apparent in the image. The topography of the surface is not uniform which is desired because the surface roughness of the sintered layer is used to achieve spectral selectivity. The roughness has random spacing on a micron and nanoscale level as seen in FIGS. 7e and 7d.

Figure 8:
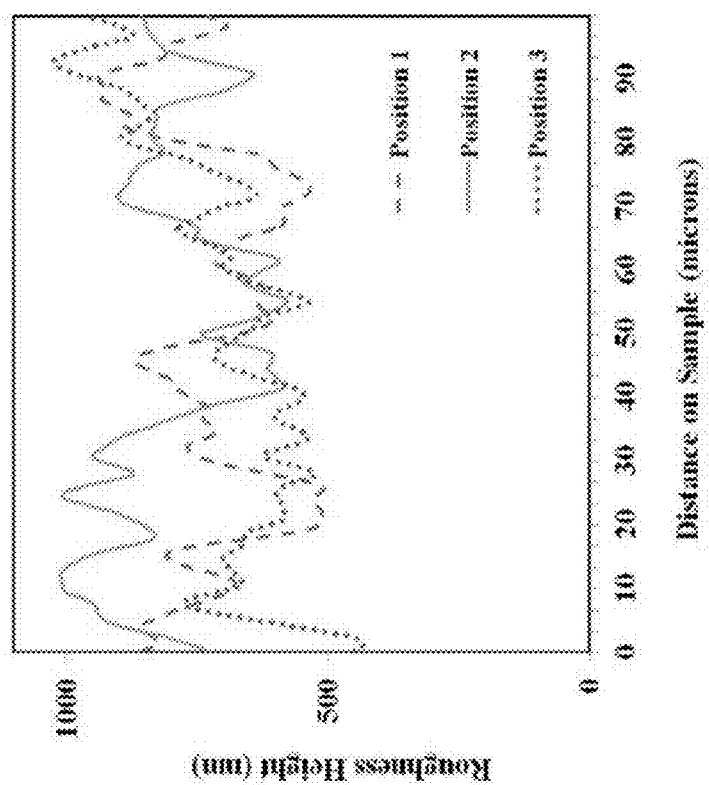
FIG. 8 shows a graph of average surface roughness height along a sample spectral selective coating.

Surface profilometer measurements were performed on the sintered layer to examine the variations in roughness across the sample. FIG. 8 shows roughness height variation taken at different positions on the sample across a distance of 100 microns. The surface roughness height mostly lies in the range of 490-1010 nm. The height variation between two nearest points that can be analyzed by the profilometer is around one micron. Thus, sub-micron variations in height are not seen in the profilometer but can be seen in the SEM in FIGS. 7c and 7d. Both roughness height and spacing contribute to spectral selectivity, and therefore SEM and profilometer data are used in conjunction to investigate spectral selectivity of the sample.

Absorptance

The average solar absorptance of the sintered tungsten layer was measured as ~83%. Polished tungsten has solar absorptance of ~52%. Thus it can be seen that having random roughness on the sintered tungsten surface can increase the solar absorptance. This increased absorptance is due to an interaction of solar wavelengths with the surface roughness of the sample, which ranges from nanoscale to microscale. The surface roughness height and spacing ranges from a few tens of nanometers to 5 microns, as can be seen from SEM and profilometer data in FIGS. 7d and 7e.

When the roughness is subwavelength (i.e., having a dimension less than the wavelength of applied light), increased solar absorptance can be explained by the effect of the surface behaving as a graded index medium that provides antireflection. When the surface roughness is longer than the wavelength (i.e., having a dimension greater than the wavelength of applied light), increased absorptance is due to the electromagnetic waves getting trapped by multiple reflections.

Remaining energy that is not absorbed is collected by the integrating sphere, and thus all of the scattered energy is measured. The combined contribution from above mentioned effects leads to an overall higher solar absorptance, ~83% for the sintered layer.

Reflectance and Emittance

Figure 9:
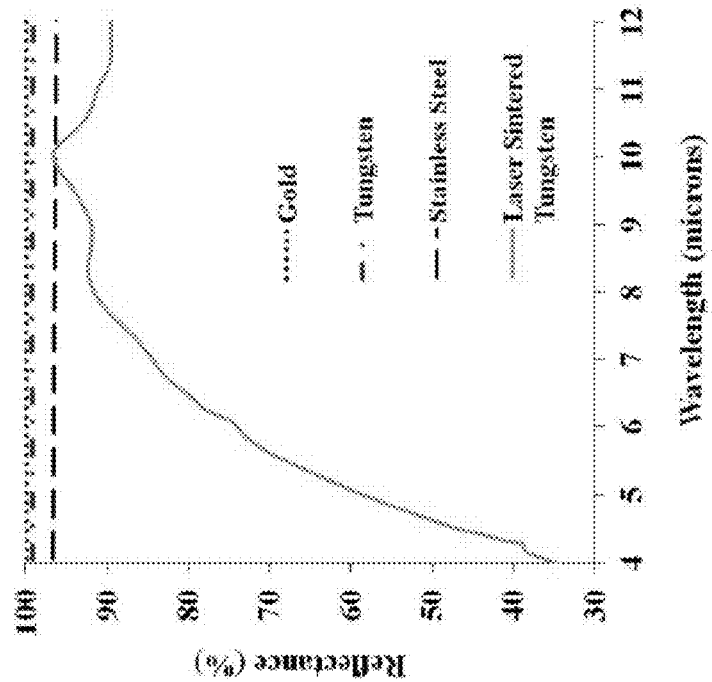
FIG. 9 shows a graph of reflectance as a function of wavelength for different metals that may be used in conjunction with the coatings of FIGS. 2 and 4.

FIG. 9 shows an experimentally measured curve for reflectance versus IR wavelength for polished gold, polished stainless steel, polished tungsten, and laser sintered tungsten. Reflectance of gold and tungsten is ~99% and 98% respectively at 4 micron wavelength and beyond. These data are close to theoretical reflectance values in the IR spectrum that can be calculated using refractive index data. The reflectance of polished stainless steel is also shown as it is the substrate on which a laser sintered tungsten layer is fabricated.

The ideal case is to have IR reflectance of the sintered tungsten layer close to polished tungsten so that the thermal emittance ε will be low. As seen from SEM in FIGS. 7b-d and profilometer data in FIG. 8, the surface roughness ranges from a few tens of nanometers to 5 μm, allowing the IR radiation to interact with the surface roughness. In FIG. 9, the reflectance of sintered tungsten is ~35-75% in the wavelength range of 4-6 microns as compared to ~98% for polished tungsten. As discussed, when the wavelength of applied light is larger than the roughness, enhanced absorptance may be expected due to the material behaving as a graded index medium. However, as the IR wavelength increases, the IR reflectance also increases. The reason is that the roughness is then smaller than the wavelength, and therefore the reflectance starts to rise and approach the value of polished tungsten as seen in FIG. 9. The intrinsic reflectance of tungsten metal is higher in the IR spectrum than in the visible spectrum, which helps to achieve higher reflectance values in the IR spectrum. During IR reflectance measurements, most of the IR scattered light gets captured by the equipment as it can collect in the range of ±35° from the normal. Some small amount of scattered energy is lost, which may indicate that light waves are being absorbed by the surface and thus resulting in a lower reflectance.

The equipment was capable of measuring reflectance only up to 12 microns. To account for reflectance beyond 12 microns, it is safe to assume that reflectance remains constant. This assumption is based on the fact that tungsten theoretically maintains a constant reflectance value of ~98.3% up to 24 microns in the IR spectrum. Also, since the wavelength beyond 12 microns is much larger than the surface roughness of the sintered tungsten layer, the reflectance for these higher wavelengths may be fairly constant. Using this measured reflectance data and extrapolating to higher wavelengths as mentioned above, thermal emittance ε at 300 K was calculated for the sintered tungsten layer. Thermal emittance ε was calculated by the formula given below:

$$\varepsilon(T) = \frac{\int_0^\infty E(T,\lambda)(1-R(\lambda))d\lambda}{\int_0^\infty E(T,\lambda)d\lambda} \quad \text{EQ 1}$$

where E(T, λ) is blackbody irradiance at temperature T, and R(λ) is measured reflectance. Thermal emittance ε of the laser sintered tungsten layer was calculated as ~11.6% at 300 K. In order to further lower the emittance ε, laser parameters may be optimized so that the resulting maximum roughness size is no larger than 1 micron.

Cost Reduction by Laser Sintering Process

A cost benefit analysis of using the disclosed laser sintering process in comparison to using cermets that need a vacuum process will now be discussed. A Schott Solar PTR 70 receiver for parabolic trough plants as used in the cost benefit analysis. The cost to buy such a vacuum receiver is typically €200€300 per meter. The receiver is ~4 m in length, thus the cost of each receiver at current foreign exchange rate of €1 to $1.10 can be expected to be ~$883-$1324. The length and outer diameter of the PTR 70 receiver are 4.060 m and 0.070 m respectively.

During the laser sintering process, tungsten nanoparticles purchased from SkySpring Nanomaterials Inc. were used. The tungsten nanoparticles cost $1867 for 1 kg. The thickness of the sintered coating is approximately one micron. The density of tungsten is 19.25 g/cm³. Therefore, approximately 17.19 g of material is needed to coat the PTR 70 receiver. Thus, the cost of tungsten material per tube is approximately $32. Assuming that the cost of purchasing nanoparticles will be similar to the cost of microparticles ($143/kg by Inframat Advanced Materials) in the near future, then the cost of tungsten needed per tube will be ~$2.50.

Process costs of laser sintering are then calculated. High power fiber lasers ~500 W are expected to cost ~$95,000 (available through IPG Photonics Corporation) that have a life time of 100,000 hours. If five of these lasers are used, the cost incurred for laser use (electricity cost not included) ~$4.75/hr. The time needed to sinter one layer for the area of the PTR 70 receiver will be four hours. And since two layers of sintering are needed, the total time needed to sinter will be eight hours per time. Hence, the process cost per tube comes to $38.

Therefore, the total cost per tube, the raw material needed, and the cost of laser uses totals to ~$40. Accordingly, the manufacturing cost of laser sintering is a significantly less than the selling price of the PTE 70 receiver, showing that laser processing can be a cost effective method. Optimization of laser processes can further reduce this cost. This cost reduction will directly contribute to the goal of 6 ¢/kWh put forward by the DOE SunShot Initiative.

Several advantages may be realized by the use of the disclosed method. For example, because sintering may be performed under atmospheric pressure, significant cost savings associated with fabricating spectral selective coatings may be achieved. Sintering under atmospheric pressure may also eliminate receiver size restrictions imposed by vacuum processes. The disclosed method may also allow for the creation of sub-wavelength roughness on the sintered layer to achieve higher absorptance and lower emittance. Because sintering under atmospheric pressure and antireflective coatings may be used, protection front degradation due to oxidation may be realized. Further, the disclosed, method may allow for sintering of hybrid metal particles to be performed to achieve increased overall performance.

What is claimed is:

1. A method of forming a spectral selective coating, the method comprising:
   providing particles on a substrate, wherein the particles include submicron particles;
   sintering the particles under atmospheric pressure to form a sintered layer on the substrate; and
   texturing the sintered layer to provide a submicron surface roughness height on the sintered layer.

2. The method of claim 1, wherein sintering the particles includes at least one of laser sintering, solid state sintering, and liquid phase sintering.

3. The method of claim 2, wherein laser sintering is performed with one of a high power direct diode laser, a solid state laser, a sealed CO2 laser, a fiber laser, and allowing gas CO2 laser.

4. The method of claim 1, wherein the particles include particles having a dimension greater than or equal to one micron.

5. The method of claim 1, wherein the particles comprise one or more of metal particles, tungsten, nickel, chromium, and steel.

6. The method of claim 1, further including applying an antireflective coating on the sintered layer.

7. The method of claim 6, wherein the antireflective coating is applied under atmospheric pressure.

8. The method of claim 1, wherein the substrate is a metal substrate.

9. The method of claim 8, wherein the substrate is a steel substrate.

10. A spectral selective coating, comprising:
    a substrate; and
    a sintered layer disposed on the substrate, the sintered layer being formed of particles sintered under atmospheric pressure, wherein:
      the particles include submicron particles; and
      the sintered layer is textured and has a submicron surface roughness height on the sintered layer.

11. The spectral selective coating of claim 10, wherein the particles include particles having a dimension greater than or equal to one micron.

12. The spectral selective coating of claim 10, wherein the particles comprise one or more of tungsten, nickel, chromium, and steel.

13. The spectral selective coating of claim 10, further including an antireflective coating on the sintered layer.

14. The spectral selective coating of claim 10, wherein the substrate is a metal substrate.

15. The spectral selective coating of claim 14, wherein the substrate is a steel substrate.

16. A solar receiver comprising:
an absorber tube having an outer surface;
a spectral selective coating disposed on the outer surface of the absorber tube, wherein, the spectral selective coating includes:
a metal substrate; and
a sintered layer disposed on the metal substrate, the sintered layer being formed of particles sintered under atmospheric pressure, wherein:
the particles include submicron particles; and
the sintered layer is textured and has a submicron surface roughness height on the sintered layer.

17. The solar receiver of claim 16, wherein the particles include particles having a dimension greater than or equal to one micron.

18. The solar receiver of claim 16, wherein the particles comprise one or more of tungsten, nickel, chromium, and steel.

19. The solar receiver of claim 16, further including an antireflective coating on the sintered layer.

20. The solar receiver of claim 16, wherein the substrate is a steel substrate.

* * * * *